(12) United States Patent
Bose et al.

(10) Patent No.: US 7,930,578 B2
(45) Date of Patent: Apr. 19, 2011

(54) METHOD AND SYSTEM OF PEAK POWER ENFORCEMENT VIA AUTONOMOUS TOKEN-BASED CONTROL AND MANAGEMENT

(75) Inventors: Pradip Bose, Yorktown Heights, NY (US); Alper Buyuktosunoglu, White Plains, NY (US); Chen-Yong Cher, Port Chester, NY (US); Zhigang Hu, Ridgefield, CT (US); Hans Jacobson, White Plains, NY (US); Prabhakar N. Kudva, New York, NY (US); Vijayalakshmi Srinivasan, New York, NY (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 11/862,559

(22) Filed: Sep. 27, 2007

(65) Prior Publication Data

US 2009/0089602 A1 Apr. 2, 2009

(51) Int. Cl.
*G06F 1/00* (2006.01)
*G06F 11/30* (2006.01)
*G06F 1/26* (2006.01)
*G06F 1/32* (2006.01)

(52) U.S. Cl. ........................ 713/340; 713/300; 713/320
(58) Field of Classification Search .................. 713/300, 713/320, 340
See application file for complete search history.

(56) References Cited

U.S. PATENT DOCUMENTS

| | | | | |
|---|---|---|---|---|
| 5,719,800 | A * | 2/1998 | Mittal et al. | 713/321 |
| 2006/0123253 | A1 * | 6/2006 | Morgan et al. | 713/300 |
| 2006/0236011 | A1 * | 10/2006 | Narad et al. | 710/240 |
| 2007/0028130 | A1 * | 2/2007 | Schumacher et al. | 713/320 |
| 2007/0050646 | A1 * | 3/2007 | Conroy et al. | 713/300 |
| 2008/0250415 | A1 * | 10/2008 | Illikkal et al. | 718/103 |
| 2008/0263373 | A1 * | 10/2008 | Meier et al. | 713/300 |

* cited by examiner

*Primary Examiner* — Thomas Lee
*Assistant Examiner* — Brandon Kinsey
(74) *Attorney, Agent, or Firm* — F. Chau & Associates, LLC; William J. Stock, Esq.

(57) ABSTRACT

A method of power management of a system of connected components includes initializing a token allocation map across the connected components, wherein each component is assigned a power budget as determined by a number of allocated tokens in the token allocation map, monitoring utilization sensor inputs and command state vector inputs, determining, at first periodic time intervals, a current performance level, a current power consumption level and an assigned power budget for the system based on the utilization sensor inputs and the command state vector inputs, and determining, at second periodic time intervals, a token re-allocation map based on the current performance level, the current power consumption level and the assigned power budget for the system, according to a re-assigned power budget of at least one of the connected components, while enforcing a power consumption limit based on a total number of allocated tokens in the system.

16 Claims, 14 Drawing Sheets

| Resource 1 token count | Resource 2 token count | Resource 3 token count | Resource 4 token count |
|---|---|---|---|
| 3 | 3 | 3 | 3 |
| 4 | 4 | 4 | 0 |
| 2 | 6 | 0 | 4 |
| 0 | 8 | 4 | 0 |
| 1 | 1 | 5 | 5 |
| 6 | 3 | 3 | 0 |

FIG. 4

| Cycles | 0 | T | T+1 | T+2 | T+3 | T+4 |
|---|---|---|---|---|---|---|
| FPU | 1 | 0 | 0 | 0 | 0 | 0 |
| FPU | 0 | 0 | 0 | 0 | 0 | 1 |
| LSU | 1 | 1 | 1 | 0 | 1 | 0 |
| LSU | 0 | 1 | 0 | 1 | 0 | 1 |
| FXU | 1 | 0 | 1 | 0 | 1 | 0 |
| FXU | 0 | 1 | 0 | 1 | 0 | 1 |
| ISU | 1 | 0 | 1 | 0 | 1 | 0 |
| ISU | 0 | 1 | 0 | 1 | 0 | 1 |
| IDU | 1 | 0 | 1 | 0 | 1 | 1 |
| IDU | 0 | 1 | 0 | 1 | 1 | 1 |
| IFU | 1 | 0 | 1 | 1 | 1 | 0 |
| IFU | 0 | 1 | 1 | 1 | 0 | 0 |

FIG. 8

METHOD AND SYSTEM OF PEAK POWER ENFORCEMENT VIA AUTONOMOUS TOKEN-BASED CONTROL AND MANAGEMENT

FEDERALLY SPONSORED RESEARCH AND DEVELOPMENT

This invention was made with Government support under Contract No. NBCH3039004 awarded by Defense Advanced Research Projects Agency. The Government has certain rights in this invention.

BACKGROUND OF THE INVENTION

1. Technical Field

The present disclosure relates to microprocessors and, more particularly, to the control of power consumption in microprocessors.

2. Discussion of Related Art

Microprocessors are being built with an increasing number of electronic components packed in increasingly small chip spaces. Issues of power consumption and dissipation come to the fore as the number of electronic components in a microprocessor increases. As semiconductor device dimensions have continued to scale down, in the push to greater component densities, the reduction in power per component has not kept pace with the increased component density. Power dissipation and consumption affect design choices and operating conditions for microprocessors. Hence, there is a need to reduce power dissipation and consumption in microprocessors. In the following, unless specifically qualified, the term "power" is used to subsume both the "dissipation" and "consumption" aspects of power parameters.

There is a distinction between the average power and maximum power dissipation. Average power refers to power averaged over a set of applications or programs, typically run by the customer. Saving the average power reduces the energy cost in wired applications and prolongs the battery life in portable applications. Maximum (or peak) power refers to the worst-case power consumption incurred by the system, where any power measurement is usually determined as an average energy per unit time value over a specified time interval t. The value of t is usually dictated by the thermal time constants of the system, but could also be specified to be an arbitrarily smaller or larger value that is not related to time constant issues, but to other system characteristics like the current delivery limits and specification of the input power supply. The peak system power limit could be changed to values lower than the absolute maximum that can be tolerated, for example, by an external controller or by system software. This may be done, for example, to conserve power in the system to lower cooling cost or to reduce ambient temperature in a data center.

Techniques for reducing power in components or resources of a microprocessor, such as clock gating, can save the dynamic or switching component of power. In addition, clock gating can indirectly reduce leakage power, e.g., due to the reduction in chip temperature that can result from the reduced switching power. That is, as the chip temperature reduces, the leakage power reduces. Another power-saving technique is called data gating. Data gating involves insertion of transition barriers at the inputs of microprocessor components. These transition barriers are typically implemented as either AND or OR logic gates. On cycles when the microprocessor component is not used, the transition barriers prevent the inputs to the component from switching, which results in saving the dynamic or switching power inside the data-gated component. Data gating can save the dynamic or switching power, and any leakage savings are indirect via chip temperature reduction effects.

Power gating (also referred to as Vdd-gating) is another known power saving technique. Power gating can reduce both leakage and switching power, as the voltage supply to the targeted circuit block is disabled when not in use.

One approach to controlling the gating of microprocessor resources involves Reactive Gating (RG) techniques. These techniques are used to control the maximum temperature of the chip and/or the maximum current drawn by the microprocessor core or the chip. RG techniques use a set of temperature or current sensors that generate signals for gating microprocessor resources if the temperature (or current consumption) sensed by one of the sensors exceeds a threshold. The threshold is set below the limit of the power dissipating capabilities of the package or below the current delivery capabilities of the power delivery system.

RG techniques do not allow relaxing the requirements on the power or current delivery systems due to threshold-based control, and the threshold must be set at a relatively pessimistic or conservative level for the reactive mechanism to trigger in time and prevent chip failure. RG techniques make it difficult to predict the performance of the processor core, because the reactive mechanism may trigger during the execution of the program. Further, the triggering mechanism for power-saving RG techniques may depend on the operating environment factors such as temperature. This triggering mechanism makes the performance of the microprocessor depend on the operating environment factors.

Techniques to vary processor performance based on the information received from thermal sensors have been proposed. These RG techniques use reactive throttling techniques, which are activated upon feedback from the on-chip monitoring of a set of performance metrics. Another approach to controlling gating involves pure predictive gating techniques that reduce the average microprocessor core or chip power, but do not guarantee any reduction under the maximum power usage or provide any upper bound on the maximum power when all microprocessor resources are fully utilized. A pure predictive gating technique may use address access information to determine when the processor is in an idle loop. These techniques for controlling gating do not allow any relaxing of the requirements on the power dissipation capabilities of the package or the current delivery capabilities of the power delivery system, which impact on the cost of the microprocessor.

The design implications posed by the maximum or peak power consumption in an integrated circuit chip that implements a microprocessor include the cost of the package and cooling solution to dissipate heat and maintain safe operating temperatures and the cost of the input current delivery to the chip to enable functionality even at peak power conditions. The conventional temperature- or current-threshold-based throttling techniques can have significant performance implications for certain workloads, depending upon the budget constraint of the product. A need exists for techniques to control the maximum power limit in a microprocessor chip, at minimal (and controllable) performance overhead.

SUMMARY OF THE INVENTION

According to an exemplary embodiment of the present invention, a method of power management of a system of connected components includes initializing a token allocation map across the connected components, wherein each component is assigned a power budget as determined by a number of allocated tokens in the token allocation map, monitoring utilization sensor inputs and command state vector inputs, determining, at first periodic time intervals, a current performance level, a current power consumption level and an assigned power budget for the system based on the utilization sensor inputs and the command state vector inputs, and determining, at second periodic time intervals, a token re-allocation map based on the current performance level, the current power consumption level and the assigned power budget for the system, according to a re-assigned power budget of at least one of the connected components, while enforcing a power consumption limit based on a total number of allocated tokens in the system.

According to an exemplary embodiment of the present invention, a method of localized self-monitoring and control at a component level to adjust a token count of a component includes monitoring an idle counter, which is preset with a fixed value P, associated with the component, while it is decremented on each cycle of successive inactivity of the component, resetting the component's token counter to zero, donating the unused tokens to central token storage and transitioning the component to a low power state upon determining the idle counter to have reached zero value, monitoring an input task queue of the component for new instructions while the component is in a powered down state; and acquiring new tokens, resetting the component's token counter, resetting the component's idle counter and transitioning the component back to a powered-up operational mode upon detecting the new instructions.

According to an exemplary embodiment of the present invention, a system of power management in a system of connected components includes a token management system (TMS) that allocates and deallocates a set of tokens across the connected components, with each token corresponding to a preset quantum of a power budget, and a total number of tokens corresponding to a power budget that can be changed at intervals of time to assure stability of the allocation and deallocation implemented in an inner token control loop, and a monitor-and-control mechanism associated with each connected component of the system and for the system as a whole that enables each connected component to contribute spare tokens for use by other connected components and receive tokens to meet a performance demand of the system.

The present invention will become readily apparent to those of ordinary skill in the art when descriptions of exemplary embodiments thereof are read with reference to the accompanying drawings.

BRIEF DESCRIPTION OF THE DRAWINGS

FIG. 4 depicts a token allocation table, according to an exemplary embodiment of the present invention.

FIG. 8 depicts an exemplary state transition table illustrating token state transitions according to the token management system of FIG. 5.

DESCRIPTION OF EXEMPLARY EMBODIMENTS

Hereinafter, exemplary embodiments of the present invention will be described with reference to the accompanying drawings. As used herein, the term "instructions" denotes a single or a set of instructions. For the purposes of this disclosure, the term "work" is roughly synonymous to "instructions". As used herein, the term "unit" is a general term. The meaning of the term "unit" may be context dependent, for example, involving a design choice that may be guided by various factors, such as an actual die size of the chip or an area budget for hardware/firmware envisaged to implement a token management system.

In various exemplary embodiments of the present invention, chip-level overall peak power budget is adhered to via a system of token-based management. For example, via a system of token-based management, according to an exemplary embodiment of the present invention, an on-chip apparatus self-regulates the distribution of work within a microprocessor in an autonomous manner (with the goal of limiting the peak power to a specified value), without human intervention. Via a system of token-based management, according to an exemplary embodiment of the present invention, an on-chip apparatus in league with system-level firmware and/or software self-regulates the distribution of work within a microprocessor in an autonomous manner.

Token-based power management systems and methods, according to exemplary embodiments of the invention, typically involve a set of interconnected units comprising an instruction processing system or microprocessor chip. Token-based power management schemes, according to various exemplary embodiments of the present invention, may be architected to operate hierarchically, whereby a stipulated peak power budget for each core and/or other resource has its own autonomous token manager.

Figure 1A:
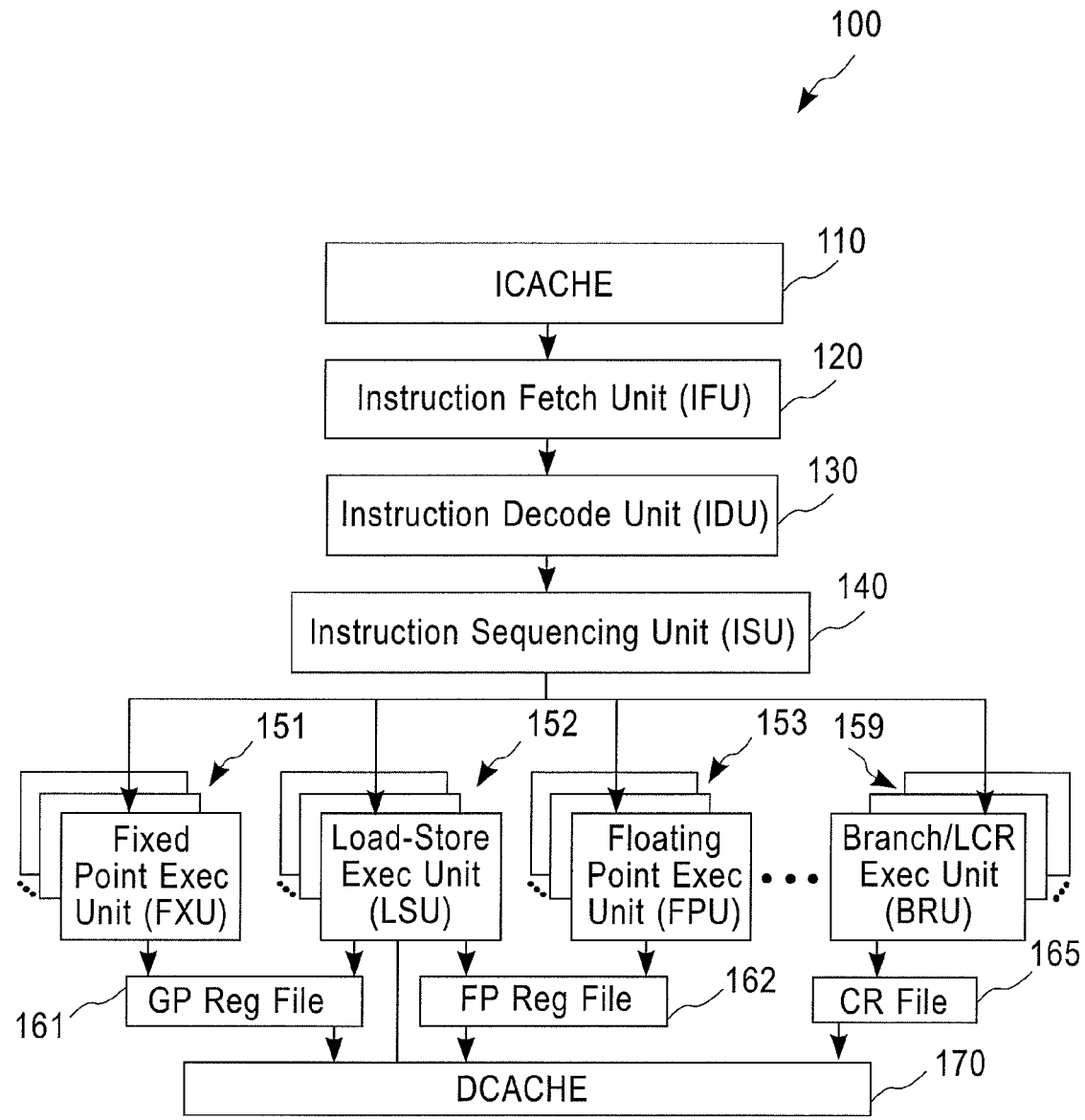
FIG. 1A is a block diagram of a microprocessor, which may be used to implement an exemplary embodiment of the present invention.

FIG. 1A is a block diagram of a microprocessor, which may be used to implement an exemplary embodiment of the present invention. Referring to FIG. 1A, the microprocessor 100 is a single-core processor. The microprocessor 100 includes an instruction cache (ICACHE) 110, instruction fetch unit (IFU) 120, instruction decode unit (IDU) 130 and instruction sequencing unit (ISU) 140. The ICACHE 110 may include array elements to store program instructions fetched from higher level (hierarchical) cache or main memory along with necessary peripheral logic to access from or fetch into the arrays. The IFU 120 may include at least one instruction fetch buffer as well as (optionally) pipelined logic stages to sequence the instruction fetch address register (e.g., presented each cycle to the ICACHE) with control inputs from other embedded sub-units, such as for example, branch history table, branch target address cache, etc. The IDU 130 may include pipelined logic stages to effect decoding of instructions received from the instruction buffer. The ISU 140 may include at least one instruction issue queue, with control logic and registers to effect dynamic instruction renaming, wake-up logic, register read operation and issue of instructions into consuming functional (execution) units at the back-end of the processor instruction flow.

The microprocessor 100 may include any number of fixed point integer execution units (FXU) 151, load-store execution units (LSU) 152, floating point execution units (FPU) 153, and branch/logic-on-condition-registers (LCR) execution units (BRU) 159. The FXU 151 may include pipelined logic stages to perform integer arithmetic operations. The LSU 152 may include pipelined logic stages to perform memory address calculations and cache/memory access operations used by load and store instructions. The FPU 153 may include pipelined logic stages to perform floating point arithmetic operations. The BRU 159 may include pipelined logic stages to perform branch instruction execution.

Instruction class execution units, for example, FXU 151 and LSU 152, may include multiple, concurrent execution paths to support multiple instruction execution per class per cycle, such as in super-scalar processor engines. As shown in FIG. 1A, the microprocessor 100 also includes a general-purpose register (GPR) file 161, floating-point register (FPR) file 162, condition code register (CR) file 165, and data cache or DCACHE 170. For example, the GPR file 161 may include a set of integer data registers that are designed to hold initial operands fetched from memory, as well as intermediate results computed prior to storing back selected data to memory. The FPR file 162 may include a set of floating point data registers. The CR file 165 may include a set of condition code registers that hold the results of certain logical conditions or predicates derived from the execution of certain instructions. These logical conditions are subsequently used to forge new control flow paths via branch instructions. The DCACHE 170 may include banks of the data cache with an optional mechanism that controls the deactivation or activation of the data cache banks.

Figure 1B:
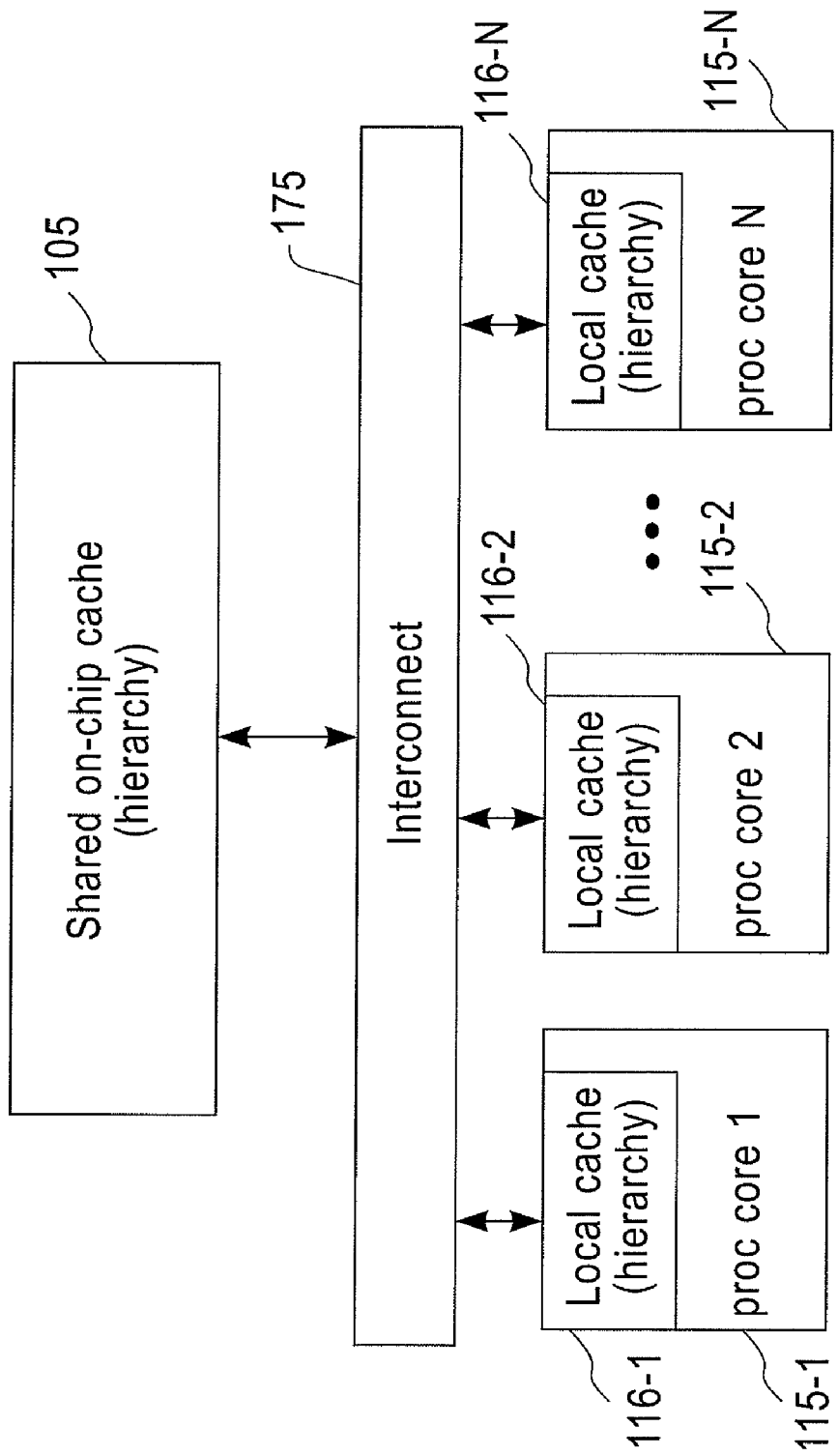
FIG. 1B is a block diagram of a multi-core processor chip architecture, which may be used to implement an exemplary embodiment of the present invention.

FIG. 1B is a block diagram of a multi-core processor chip architecture, which may be used to implement an exemplary embodiment of the present invention. In this example, the multi-core processor architecture entails processor cores, interconnects and caches. Referring to FIG. 1B, a shared on-chip cache 105 is connected via an interconnect 175 to multiple processor cores 115-1, 115-2 and 115-N, wherein each processor core 115-1, 115-2 and 115-N is operatively coupled to a local cache 116-1, 116-2 and 116-N, respectively. It is to be understood that the local caches 116-1, 116-2 and 116-N may comprise a hierarchy of caches.

Figure 2:
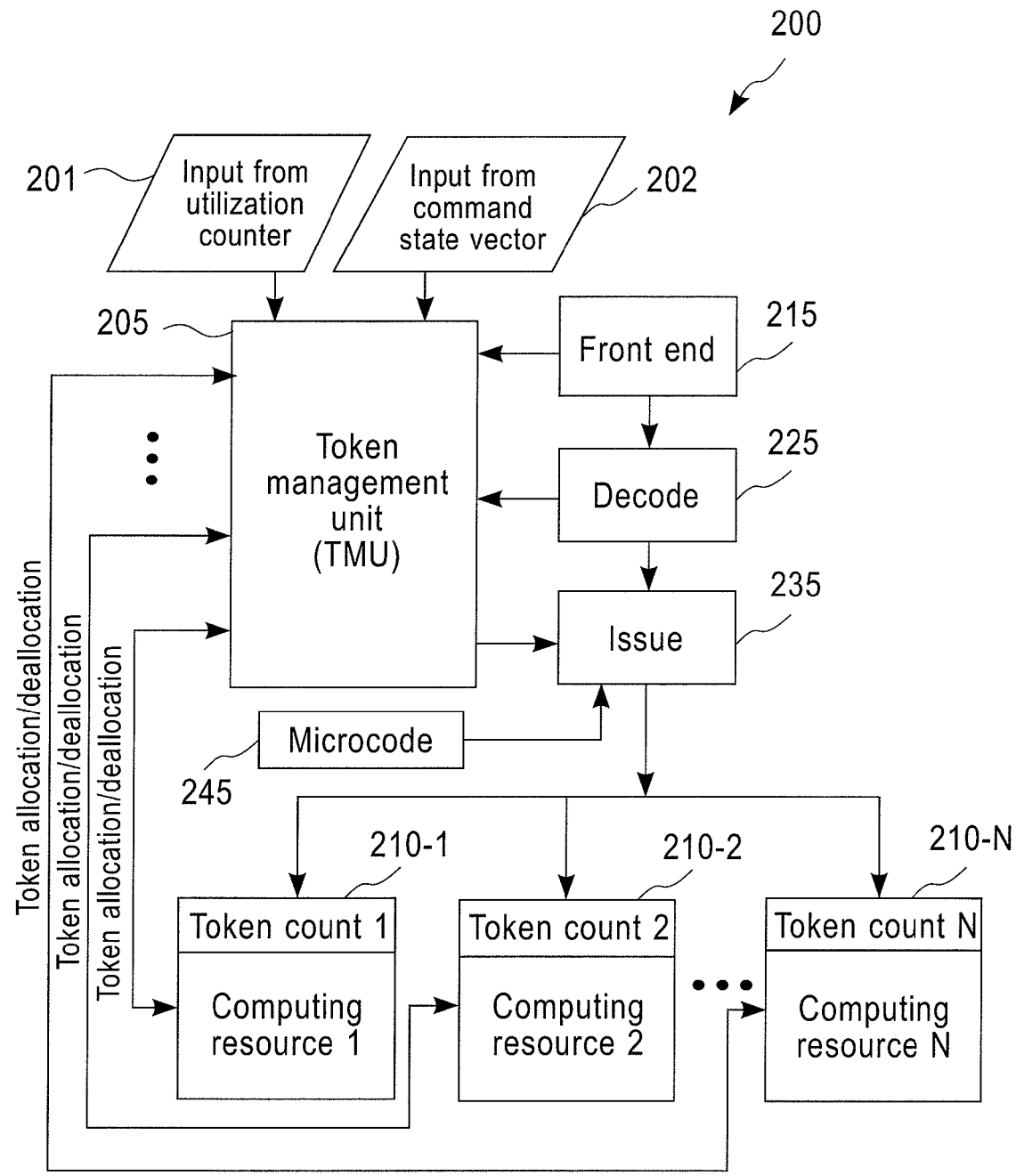
FIG. 2 is a flowchart schematically illustrating an operation of a token management system that uses an explicit, centralized token management unit (TMU), according to an exemplary embodiment of the present invention.

FIG. 2 is a flowchart schematically illustrating an operation of a token management system that uses an explicit, centralized token management unit, according to an exemplary embodiment of the present invention. Referring to FIG. 2, the token management system 200 includes an explicit, centralized token management unit (TMU) 205 and a connected set of computing resources (referred to herein interchangeably as "components" or "resources" or "units") 210-1, 210-2 and 210-N. For example, the components 210-1, 210-2 and 210-N may correspond to the execution units FXU 151, LSU 152 and FPU 153 of the microprocessor 100 shown in FIG. 1A. Even though only three components 210-1, 210-2 and 210-N are shown as examples, those skilled in the art will appreciate that any number of resources can be used.

Power consumption by the computing resources (e.g., 210-1-210-N shown here) determines to a substantial extent the total power consumed and dissipated by the microprocessor. Hence, reducing and controlling the power consumed by the processor resources (e.g., resources 210-1, 210-2 and 210-N) can achieve control of the overall power of the microprocessor (e.g., microprocessor 100 of FIG. 1A).

The token management system 200 includes token-managed units, such as for example, the computing resources 210-1, 210-2 and 210-N. The token management system 200 also includes a front-end unit 215, decode unit 225, issue unit 235 and microcode 245. The front-end unit 215, decode unit 225 and issue unit 235 may be operational at a fixed token budget, as known by the TMU 205, or may not be token-managed. The front-end unit 215, decode unit 225 and issue unit 235 may correspond to the IFU 120, IDU 130 and ISU 140 of FIG. 1A.

In an exemplary embodiment of the present invention, each of the token-managed resources 210-1, 210-2 and 210-N includes an embedded token counter. For example, the token counters may be set (by for example, preset, reset, decrement and increment operations) by the TMU 205 depending on its monitored power state and its performance demand.

The TMU 205 may receive two inputs, e.g., inputs 201 and 202 shown in FIG. 2. Input 201 may comprise utilization markers that can be used by the TMU 205 to determine the power and performance level of the processor or system. Examples of such utilization markers include but are not limited to performance counters that measure entities like the number of instructions completed within a given cycle window, the occupancy statistics of a given buffer, queue or pipeline stage, the access frequency of a given cache or register file, the temperature of a region, as indicated by a thermal sensor, etc. Input 202 may comprise a command state vector sourced by an external controller that may be implemented in hardware, software or both. The external controller may provide operational directives to the TMU, in response to environmental conditions of the overall, larger system of which the subject processor system is a part.

The power state of the TMU 205 may be measured as a combination of the current token count and monitored temperature. An on-chip, per-resource temperature sensing device (not shown) may be provided, such as a digital or an analog sensing device that gauges the localized temperature. The performance demand on the system of connected components may be gauged by a digital proxy, such as a weighted combination of direct or indirect performance indicators, including but not limited to instructions completed per cycle (IPC), cache or TLB hit or miss rates, branch mis-prediction rates, instruction flush and/or re-issue rates.

Each token-managed resource (e.g., 210-1, 210-2 and 210-N) may be designed with up to as many power modes as there are states in embedded token counter. In such cases, when the resource has a 2-bit token counter, the resource may be equipped with up to $2^2=4$ power modes (e.g., LO, MED, HI and TURBO in the case of four modes, or LO, MED and HI in the case of three modes, or LO and HI in the case of two modes), depending on what encoding of the token counter is imposed by the TMU 205 and an intra-resource token interpreter. Example mechanisms to design token-managed units to operate at different power modes, such that the token-imposed limits are adhered to, will be described later in this disclosure.

Let T(i) denote the number of tokens (at a particular stable period of operation) assigned to the ith managed unit, where i=1, 2, . . . , N. In an exemplary embodiment of the present invention, the TMU 205 always ensures that $\Sigma T_i \leq M$, where M is a design-specific constant that is programmed into the TMU 205. For example, the sum of the token counts across all N managed units is less than a certain programmed maximum of M.

Maintaining the total token count at the level of M typically implies the maximum performance mode of the whole chip or system. A correlation may be drawn between a higher value of M and a higher performance, higher power chip. Such a monotonic behavior with regard to maximum token count and performance is not guaranteed, unless the design is architected to ensure such behavior under all conditions. In an exemplary embodiment of the present invention, functions of the TMU 205 include periodically reading the power state of each managed resource and re-assigning the token allocation across the units based on the reading.

The TMU 205 may allocate zero tokens for a particular resource unit, for example, to indicate the lowest power level for that unit. For a given implementation, this condition may indicate "power gate off" (referred to herein as "power off"). In such cases, the particular resource unit would be unavailable for additional work during the given control period. If the issue unit 235 determines that new work is needed for an unavailable or power off resource unit, possible actions in collaboration with the TMU 205 include: (a) the instructions may be stalled in the issue queue until the unit is powered back on in the next control period, under TMU 205 command; (b) the instructions may be issued to an alternate unit that is available for the same function; (c) the instructions may be executed in software under firmware (microcode) control; and (d) the issue unit 235 may cause the TMU 205 to cause an onset of an immediate termination of the current control period through an asynchronous interrupt mechanism, allowing it to do a pre-emptive re-allocation of tokens across the units, causing the idle (power off) unit to wake up and accept new work. In various exemplary embodiments of the present invention, TMU 205 is programmed to take on one or a combination of the actions (a), (b), (c) or (d) described above, depending on the amount of accumulated new work for the stalled unit, the time remaining for the current control period, and/or other implementation-specific conditions, in a manner that minimizes performance loss.

In an exemplary embodiment of the present invention, when the issue unit 235 determines that new work is needed for an unavailable or power off execution unit, the instructions are stalled in the issue queue until the unit is powered back on in the next control period, under TMU 205 command. In an exemplary embodiment of the present invention, when the issue unit 235 determines that new work is needed for an unavailable or power off execution unit, the instructions are issued to an alternate unit that is available for the same function, under TMU 205 command.

Figure 3:
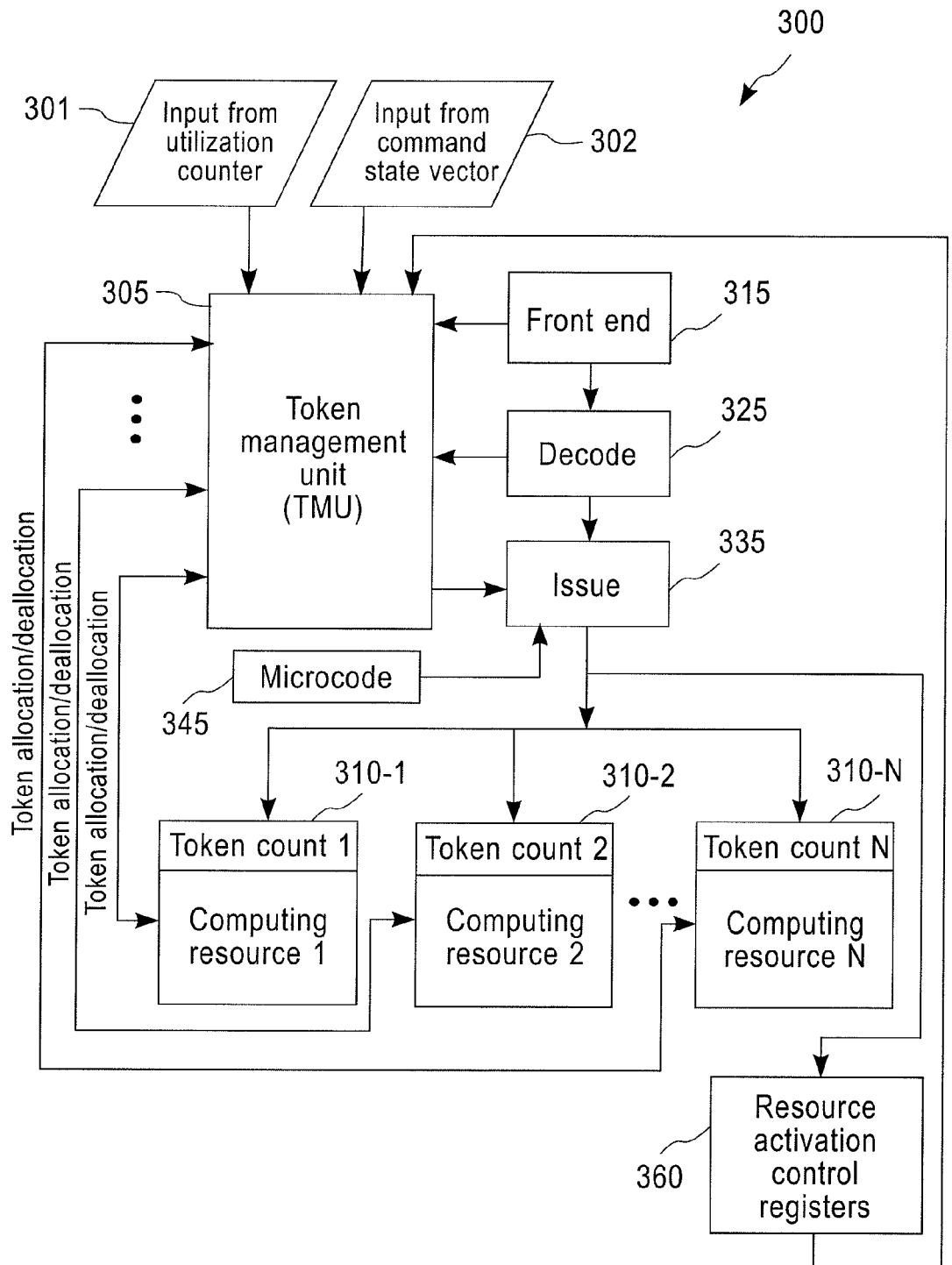
FIG. 3 is a flowchart schematically illustrating an operation of a token management system that uses a centralized TMU in conjunction with specific added resource activation control registers, according to an exemplary embodiment of the present invention.

FIG. 3 is a flowchart schematically illustrating an operation of a token management system (TMS) that uses a centralized TMU in conjunction with specific added resource activation control registers, according to an exemplary embodiment of the present invention. Referring to FIG. 3, the token management system 200 includes token-managed units, such as for example, the computing resources 210-1, 210-2 and 210-N. The token management system 300 also includes a front-end unit 315, decode unit 325, issue unit 335 and microcode 345.

In the management system 300, when the issue unit 335 determines that new work is needed for an unavailable or power off resource unit, the instructions are executed in software under firmware (e.g., microcode 345) control. The communication protocol interface between hardware and software includes, in this example, a set of resource activation control registers 360. A subset of these registers may be set by firmware to communicate operands and commands for use by system software; and, similarly, software sets a subset of these registers after completion of assigned operations.

The issue unit 335 may cause the TMU 305 to cause an onset of an immediate termination of the current control period through an asynchronous interrupt mechanism, allowing it to do a pre-emptive re-allocation of tokens across the units, causing an idle unit to wake up and accept new work.

The sense-and-actuate control time period, herein referred to as "T", is a design parameter for which the TMU is programmed. With a given fixed value of M, larger performance overheads can be expected as T is increased, e.g., where there is no facility for pre-emptive termination of the control period, such as via an asynchronous interrupt, as described above. Decreasing T requires that the TMU do the sense-and-actuate function ever faster; below a certain value of T, the reaction time may result in possible oscillatory behavior of token allocation and eventual performance loss. A value of T, for any given M, may be adaptively set during initial bring-up/test (e.g., with representative test workloads) of the microprocessor chip.

FIG. 4 depicts a token allocation table, according to an exemplary embodiment of the present invention. Referring to FIG. 4, the exemplary token allocation table shows possible different token allocations across R=4 managed resource units, with a maximum token budget of M=15, where the token manager TMU fixes a budget of 3 tokens for all other non-managed units (including itself), and distributes the remaining 12 tokens across the 4 managed units.

Figure 5:
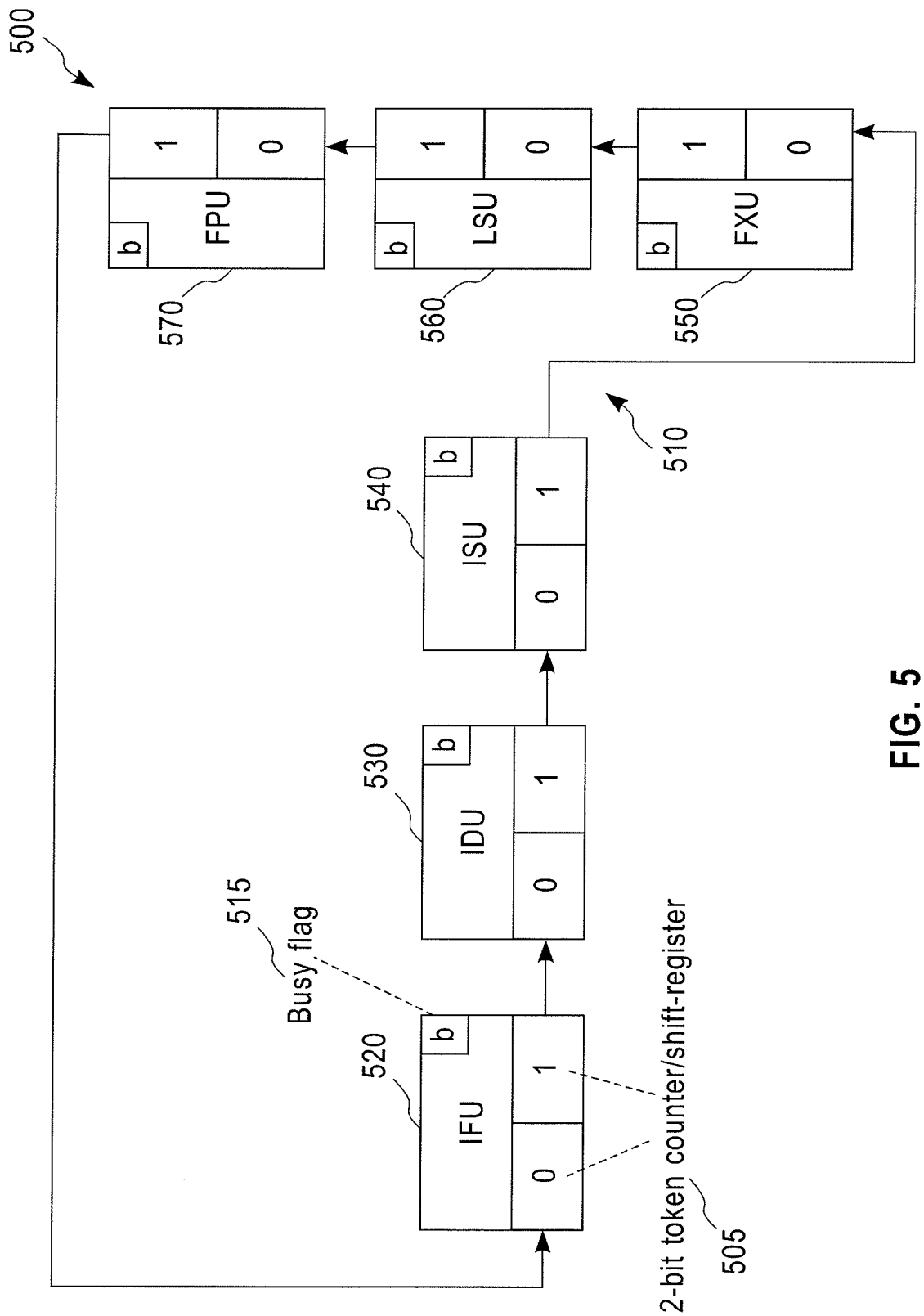
FIG. 5 is a flowchart illustrating an operation of a token management system (TMS) that uses a distributed token control mechanism, according to an exemplary embodiment of the present invention.

FIG. 5 is a flowchart illustrating an operation of a token management system that uses a distributed token control mechanism, according to an exemplary embodiment of the present invention. Referring to FIG. 5, the token management system (TMS) 500 is a ring-connected, distributed control (self-managed) TMS, with each unit having an embedded token-management functionality (TMU) function. Token-management functionality is distributed across the managed units themselves in TMS 500, and centralized TMU functionality can be avoided.

As shown in FIG. 5, a unidirectional ring-structured interconnect may be used for the token exchange across six monitored units: IFU 520, IDU 530, ISU 540, FXU 550, LSU 560 and FPU 570. The main computational data flow and unit connectivity may be as shown in FIG. 1A. The ring network applies to the token-based sense-and-propagate protocol.

Although six monitored units are shown in FIG. 5, it is to be understood that any number of units may be monitored. In this example, each managed unit has a 2-bit token counter/shift-register 505, and the token-count per unit is interpreted to be the decimal arithmetic sum of the two bit values. Here, "00" denotes zero, a condition that implies low power or idle (with possible power-down, depending on implementation choice). "01" or "10" denotes that the token count is one, and "11" denotes that the token count is two.

The units' 2-bit token count registers are connected in a ring network, such that every T cycles (the control period), the contents of the count registers are shifted right. For example, the combined shift register may be initialized during bring-up to the setting "010101010101", so that under normal operation, without any need for power management, each unit always has one power token, even after each shift operation every T cycles. Each managed unit has a busy flag bit "b" 515. For example, the flag bit 515 normally may be set to 1, to indicate usage. Each unit may be equipped with an idle-counter (not shown), which may count down from a preset threshold value P, on successive idle cycles. The idle-counter may be reset to P each time it receives new work for processing. If the idle counter reaches zero, that event may cause the unit to reset the token counter to 00 (zero) and may also initiate action to transition the unit to the lowest power or possibly idle (power-off) mode.

Depending on the implementation, the transition to 00 state may take one or two T-cycle periods, or could be done through an asynchronous reset. If state transitions are only allowed at synchronous T-cycle boundaries, then a b=0 flag would cause a 01 state to transition to 00 at the beginning of the next control period T, with the "1" token passed onwards to the next unit. However a 10 state would first transition to 01 and then to 00 in the subsequent period, thereby contributing the "1" token to the next stage. An alternate implementation would reset the token counter state to 01 immediately after the idle-counter reaches zero, and prior to the transition to the next control period.

In an exemplary embodiment of the present invention, a unit in 00 (idle) state will not accept a 1 token from the prior state. With the transition to the 00 state, an implementation choice would be for the unit to reconfigure the ring connectivity, such that (effectively) the idle unit is bypassed in future token shift operation cycles. This could be accomplished, for example, by setting the latches of the token count register in transparent mode, once it is reset to the 00 state. When an immediately prior producer unit (see FIG. 1) recognizes the onset of new work for a consuming functional (execution) unit U that is in lowest power or idle state (00), it asserts a signaling message that initiates the unit's "wake-up" while resetting its token count to 01 or 10. This also brings back the unit's count register into the global shift register control ring. At the same time, coordinated logic across the adjacent neighbor units U−1 and U+1 (in terms of the token ring shift register) must ensure that the total token count in the system does not exceed the stipulated maximum, for example, M=6 in this scenario. Example logic to ensure such compliance will be discussed later in this disclosure with reference to FIGS. 6 and 7.

Figure 6:
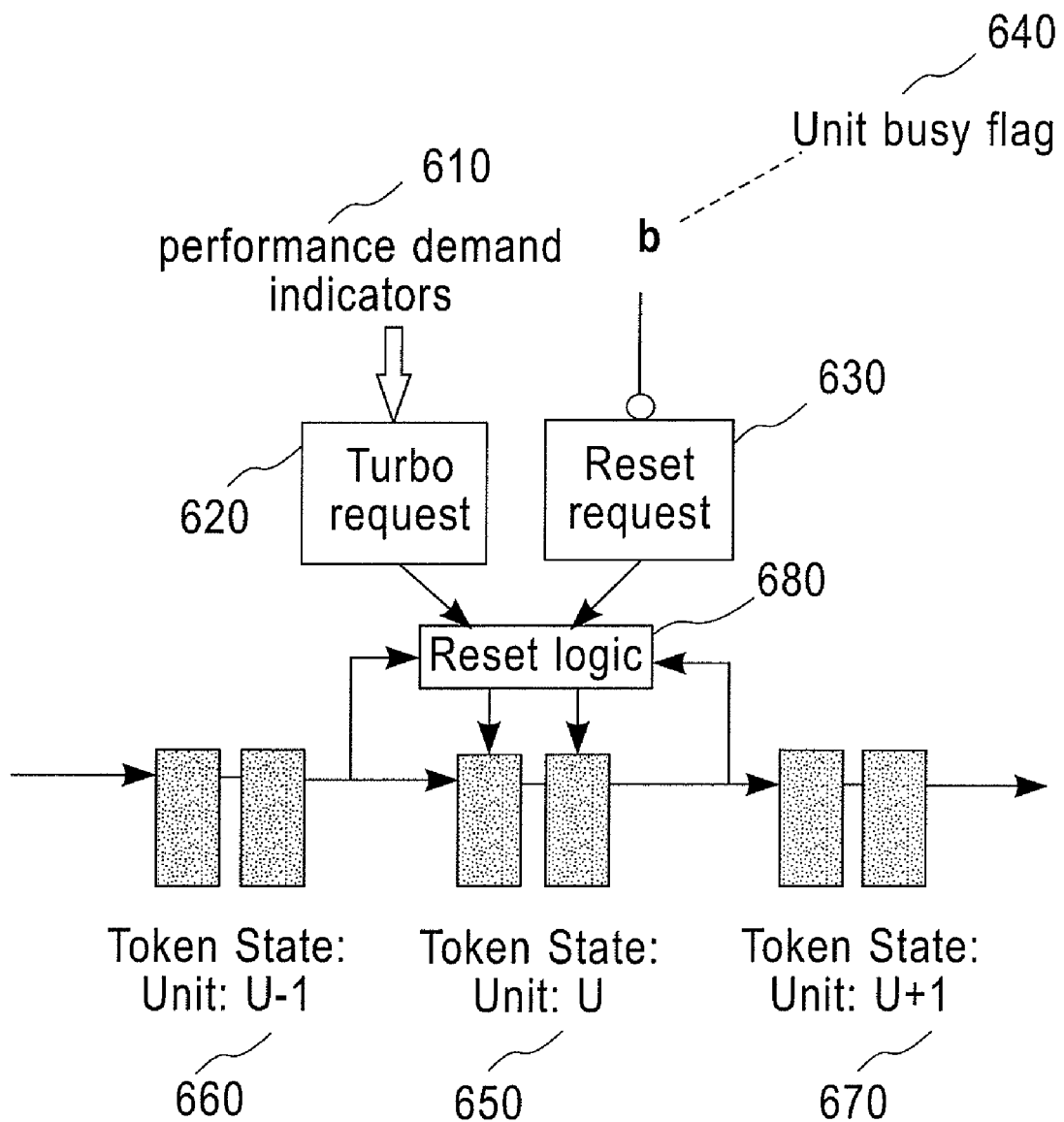
FIG. 6 shows a token state register (TSR) reset mechanism, according to an exemplary embodiment of the present invention, in the context of the exemplary TMS embodiment illustrated in FIG. 5.

FIG. 6 shows a token state register (TSR) reset mechanism, according to an exemplary embodiment of the present invention, in the context of the exemplary TMS embodiment illustrated in FIG. 5. The schematic in FIG. 6 shows a segment of the ring-connected TSR structure, with example stage U 650 receiving input from the preceding stage U−1 660 and forwarding its output to the subsequent stage U+1 670. The reset logic 680 provides the functionality of resetting the token state of stage U to "00" to indicate the lowest power state. Similar reset logic can be replicated for all stages of the ring. The reset logic 680 receives input from the turbo request block 620 and the reset request block 630.

The turbo request block 620 receives input from the performance demand indicators 610, such as a subset of the utilization markers described in connection with FIG. 2. If the performance indicators are such that re-activation of the resource controlled by stage U of the TSR mechanism is indicated, then the reset logic 680 causes the token state of stage U 650 to be set to "01", "10" or "11" as needed. If the busy flag b corresponding to the resource controlled by TSR stage U is 0 (indicating inactivity or idle state) then the reset request block 630 starts measuring the time period of continuous inactivity, and triggers a reset of the TSR stage U to "00" if the inactive period crosses a preset threshold.

Figure 7:
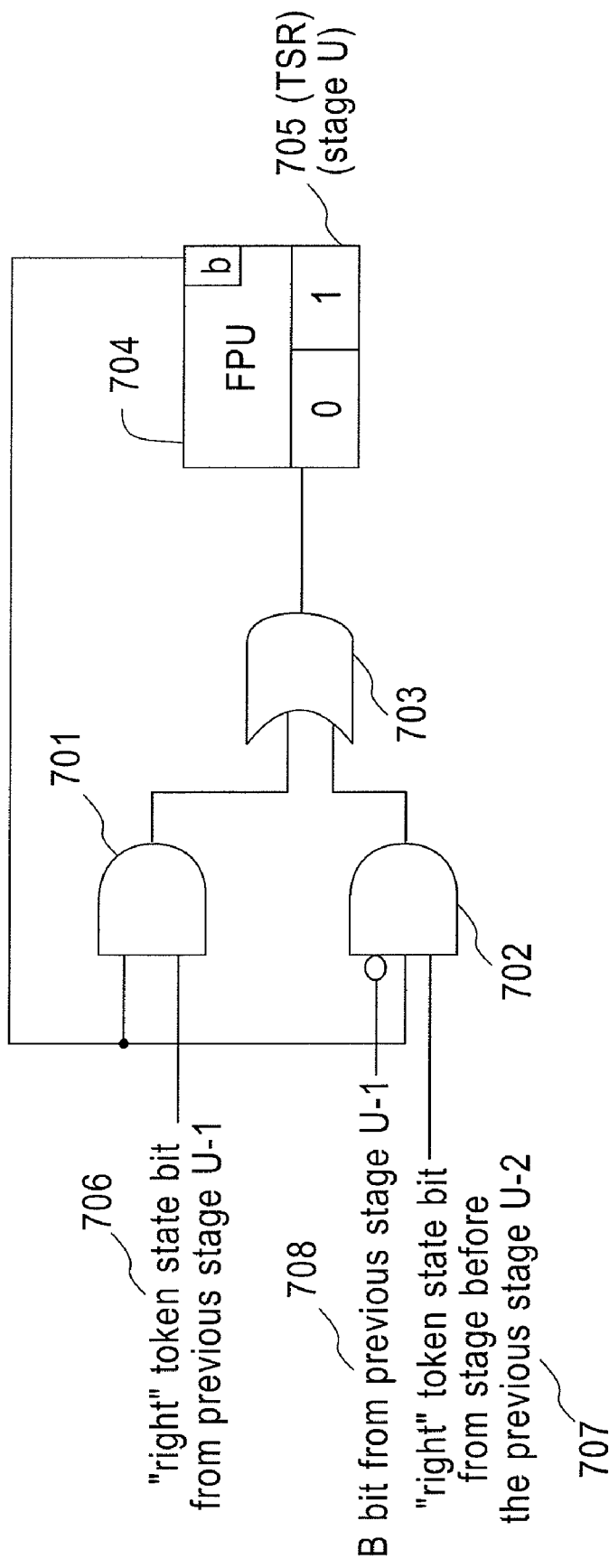
FIG. 7 shows a logic diagram implementing token ring bypass semantics, according to an exemplary embodiment of the present invention, in the context of the exemplary embodiments illustrated in FIGS. 5 and 6.

FIG. 7 shows a logic diagram implementing token ring bypass semantics, according to an exemplary embodiment of the present invention, in the context of the exemplary embodiments illustrated in FIGS. 5 and 6. Transitions that take place when a unit U determines the need (due to higher performance demand) to raise itself to a higher power mode (e.g., "11") than the nominal "01" or "10" state are described below.

If the current control period token state of U is "01" then the token state register is configured to ensure that the complement of "1", namely "0" is enabled for the right shift operation in the next control period, T. At the same time, the right-shift path from the left bit "0" is disabled, and the left-bit itself is toggled to "1". As a result, during the next control period, the combined state of units U−1, U and U+1 goes from: 10 01 10 to 01 11 00. That is, across the three units the total token count remains 3, but U transitions to the highest power mode, while U+1 transitions to the lowest power mode.

If the current control period token state of U is "10" then U sets U+1's token count register to transparent mode. During the next control period state transition, U sets its own token state to "11", while U+1 gets set to "00" (or is effectively bypassed in the token ring shift register flow).

As indicated in FIG. 7, the busy bit B of stage U of the TSR is fed back to the AND gate 701, that also takes another input 706 comprising the "right" token state bit from the previous stage U−1. Similarly, the second AND gate 702, takes as input 708 the inverted form of the busy bit B from the previous stage U−1, along with the busy bit B from the current stage U and the "right" token state bit 707 from the previous-to-previous stage U−2. The outputs of the AND gates 701 and 702 are fed to the OR gate 703 to produce the net output that constitutes the value to be shifted into the left token state bit position of the TSR for stage U.

In the exemplary embodiment described in connection with FIG. 7, it is assumed that a unit is shut down immediately after detection of inactivity (i.e., without a wait period) and it is turned back on when there is new work. Thus, when stage U−1 is idle, or not busy, its corresponding TSR stage is effectively bypassed by feeding in the "right" token of stage U−2, via AND gate 702 to the TSR of stage U.

FIG. 8 depicts an exemplary state transition table illustrating token state transitions according to the token management system of FIG. 5. Referring to FIG. 8, the transitions in each unit's token state register (TSR) take place at the end of every T machine cycles, where T is referred to as the control period or window. The table shows a case where the floating point unit (FPU) is idle (or in the lowest power mode) for four consecutive control periods, during which its TSR is reset to "00" and bypassed from the token ring network. The example logic embodiment indicated in FIGS. 6 and 7 ensure that the total token count M remains held at 6, during the FPU's idle period, and where/when possible, the extra token is donated to the resource (function) unit whose local performance indicators imply that it could use an extra power token.

Figure 9:
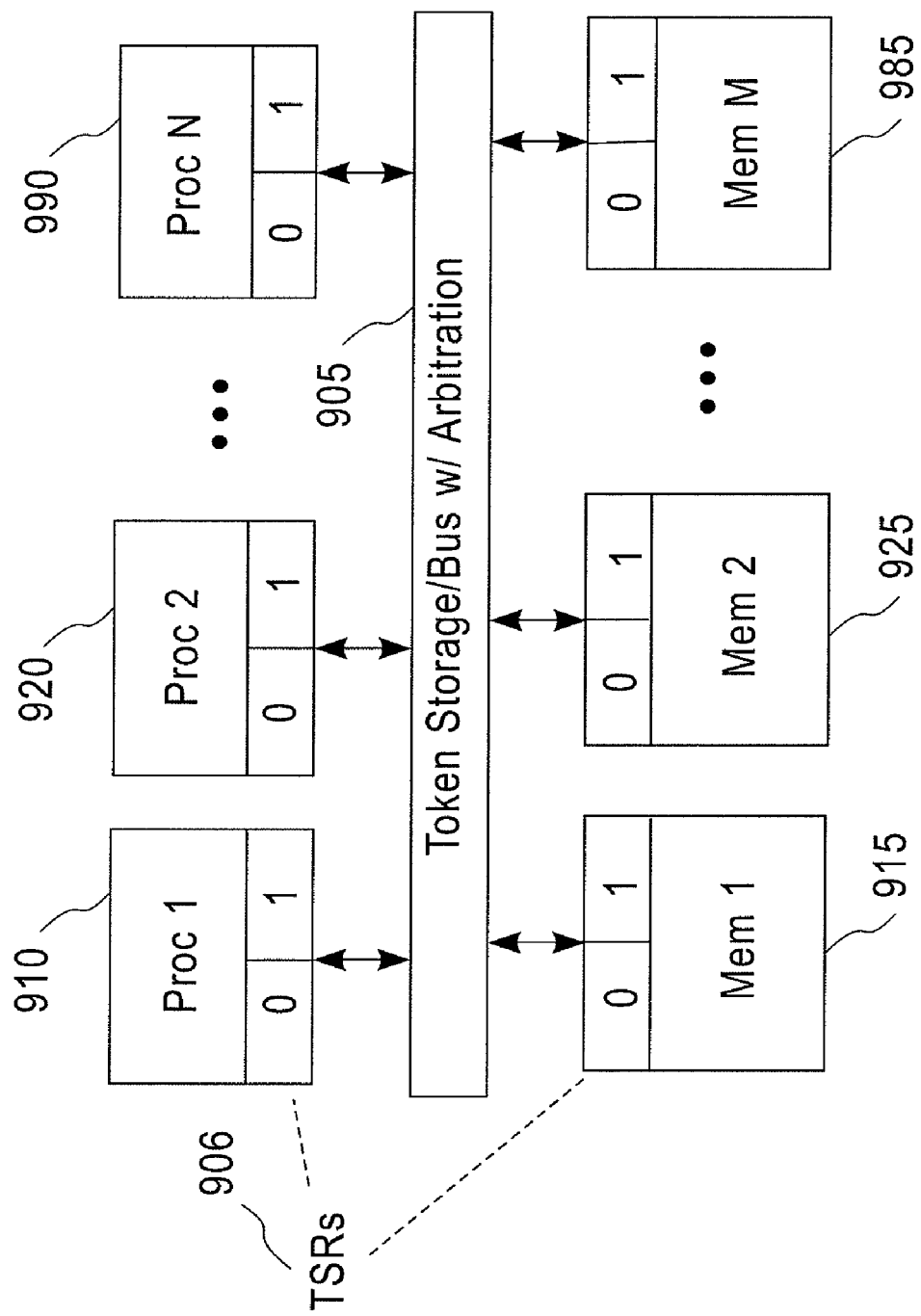
FIG. 9 is a diagram illustrating a bus-based token exchange system for a multi-core processor chip or a multiprocessor system, according to an exemplary embodiment of the present invention.

FIG. 9 is a diagram illustrating a bus-based token exchange system for a multi-core processor chip or a multiprocessor system, according to an exemplary embodiment of the present invention. FIG. 9 shows an exemplary embodiment of a generalized scheme for token storage and exchange using a bus-based communication protocol. Here a multi-core processor chip or a multiprocessor system is pre-supposed, in which the granularity of managed resources (components) is abstracted up to the level of individual processor cores (e.g., N cores: Proc-1 910 through Proc-N 910) and cache/memory modules (e.g., M cache/memory modules: Mem-1 915 through Mem-M 985).

Referring to FIG. 9, the components are interconnected via a centralized bus 905 that has embedded space for token storage and specialized interfaces to support a token exchange protocol among the managed components of the system. The bus 905 is also equipped with arbitration logic and protocol to determine the order in which multiple, simultaneous requests for token read/write operations are to be serviced. Each managed component is equipped with an embedded tokens state register (TSRs 906) that record the token state of the component in a manner similar to the previously described system embodiments. Each managed component, in response to its own operating conditions (as evidenced by its utilization markers) can either attempt to donate one or more token(s) to the embedded token storage space within the centralized bus 905, or to read (receive) one or more token(s) from the bus 905. Each token connotes a pre-specified quantum of power, and as such, the total number of tokens owned by a component determines its own power limit. Since the total number of tokens in the system is a fixed quantity, the power consumption of the full system is enforced to adhere to a maximum limit in an autonomous manner.

Figure 10:
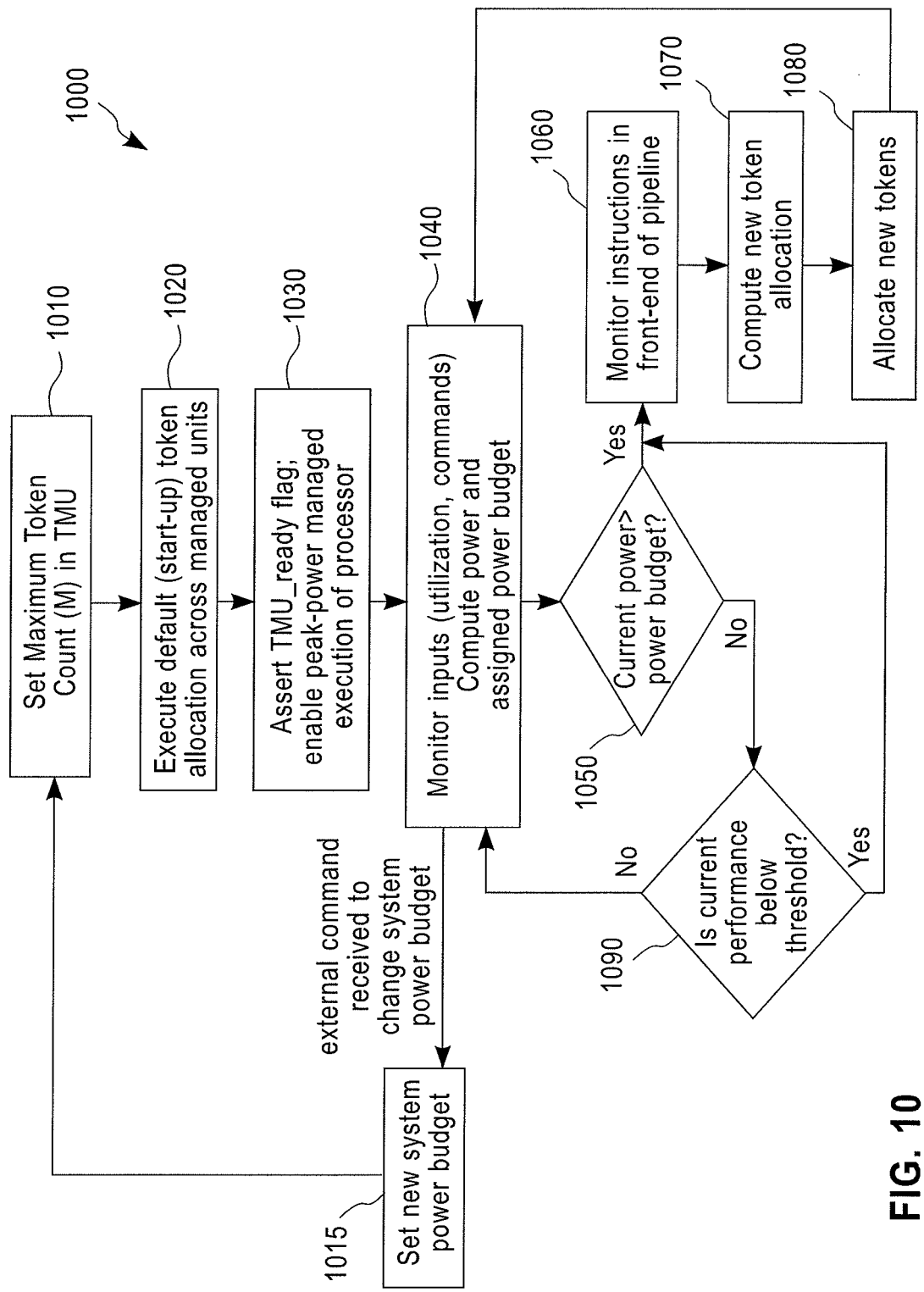
FIG. 10 is a flowchart that illustrates a method of token-based peak power control and management that presupposes a centralized token management unit according to the token management system (TMS) of FIG. 4.

FIG. 10 is a flowchart that illustrates a method 1000 of token-based control and management of peak power in a system of connected components, in accordance with the available execution semantics available from exemplary system embodiments such as those described in connection with FIGS. 2 and 3. For example, the system of connected components may be a microprocessor. Referring to FIG. 10, in block 1010, the maximum token count M is set based on the default setting of the maximum system power budget. The setting of the maximum token count M can be effected via commands received from system software (e.g., operating system or hypervisor), firmware or via preset hardware or via an external controller. In block 1020, the default (start-up) token allocation map is initiated. For example, the token allocation map is initiated across the connected components wherein each component is assigned a power budget as determined by the maximum token count M. The initiation of the token allocation map is effected by TMU. Initializing the token allocation map across the connected components may include setting a number of tokens available for allocation in accordance with the assigned power budget for the system, and allocating the tokens among the components by setting bits within each component's token counter. Each component's token counter can be connected in a ring network as a token shift register. In an exemplary embodiment of the present invention, the assigned power budget for the system is held constant for a period of time such that a token-based peak power control loop stabilizes to enforce the power consumption limit before it can be changed.

In block 1030, TMU functionality is enabled. In an exemplary embodiment of the present invention, enabling TMU functionality includes asserting a TMU_ready flag and enabling peak-power managed execution of a processor. In the method 1000, blocks 1040, 1050, 1060, 1070, 1080 and 1090 comprise an iterative sense-and-actuate cycle, as described below.

In block 1040, utilization sensor inputs and external command inputs (e.g., command state vector inputs) are monitored, the current performance and power levels are computed, and an assigned power budget is determined. For example, monitoring command state vector inputs can include reading of encoded commands. Determining the assigned power budget for the system can include decoding of the command state vector inputs.

Determining the current performance level can be based on determining the average number of instructions completed per machine cycle, for example. Determining the current power consumption level can be based on determining an estimate from at least one of the utilization sensor inputs and values read from temperature indicators.

The current performance level, current power consumption level and the assigned power budget for the system based on the utilization sensor inputs and the command state vector inputs can be determined at periodic time intervals. For example, a periodic sampling rate can be used to monitor power and performance levels, and a periodic actuation rate can be used to re-compute the number of tokens and the allocation of tokens in the token allocation map.

In block 1050, determine whether the current power is greater than the assigned power budget. In the case when the power is greater than the assigned power budget, in blocks 1060, 1070 and 1080 monitor the current work demand, compute a new token allocation map and re-assign the token distribution with the goal of reducing power, at minimal performance cost. In the case when the power is less than or equal to the assigned power budget, the performance level is examined, in block 1090, and the token allocation map is recomputed to boost performance. In an exemplary embodiment of the present invention, a token re-allocation map is periodically determined based on the current performance level, the current power consumption level and the assigned power budget for the system, according to a re-assigned power budget of at least one of the connected components, while enforcing a power consumption limit based on a total number of allocated tokens in the system.

In an exemplary embodiment of the present invention, determining the token re-allocation map includes determining if the system power consumption level is greater than the assigned power budget for the system, and recomputing the number of tokens available and the allocation of tokens in the token allocation map such that the power consumption limit is enforced upon determining that the current power consumption is not equal to the assigned budget.

Determining the token re-allocation map can include forwarding of a token to a successor component and/or receiving a token from a predecessor component using a ring-connected token shift register (TSR) control mechanism. This can include resetting of each component's token count and disabling or enabling the token counter from the ring-connected TSR control mechanism, depending upon an assessment of one of a level of inactivity and new work demand for that component. Determining the token re-allocation map can include exchanging tokens across components via a shared bus resource, in response to conditions detected at the component level.

The sense-and-actuate cycle is invoked every T processor cycles (where T is a programmable design parameter that may be set and changed by an external controller or system software at start-up time or even dynamically during program execution).

At time granularities that are significantly greater than T, the external controller or system software may provide an altered maximum system power budget. Such an occurrence is detected in block 1040, causing a new system power budget to be determined in method step 1015. This causes a re-initialization of the maximum system token count via block 1010.

Figure 11:
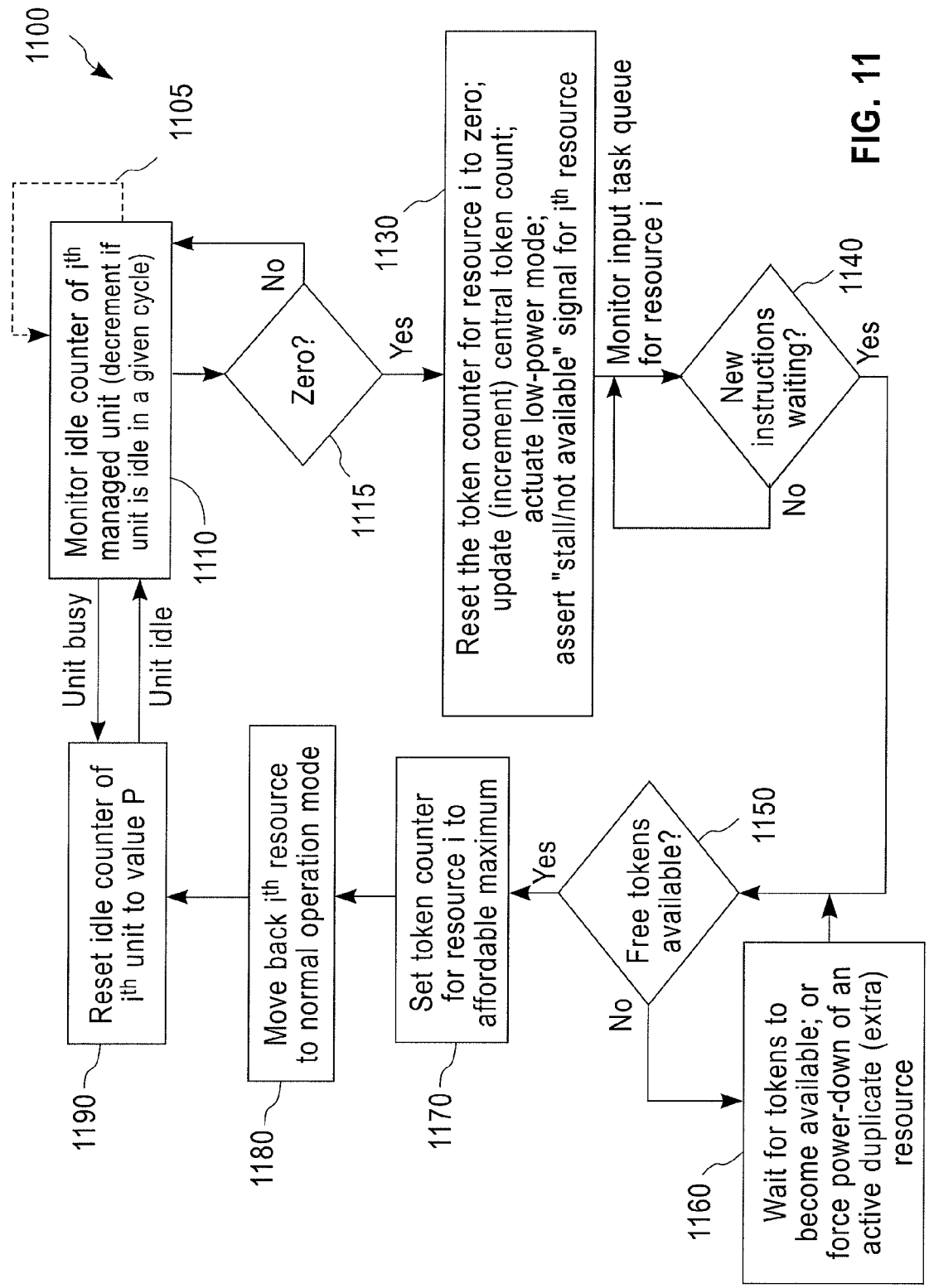
FIG. 11 is a flowchart illustrating a method of localized control, at the level of each managed resource or unit, in the context of the TMS exemplary embodiment of FIG. 2 or 3, wherein token counter set/reset mechanism is effected.

FIG. 11 is a flowchart illustrating a method of localized control, at the level of each managed resource or unit, in the context of the TMS exemplary embodiment of FIG. 2 or 3, wherein token counter set/reset mechanism is effected. According to the exemplary system embodiments depicted in FIG. 2 or FIG. 3, each managed resource is associated with an "idle counter" that is designed to keep track of the consecutive cycles of inactivity. Referring to FIG. 11, in a preliminary step (not shown) each idle counter is reset to a predefined value of P cycles. The value P is selected in such a manner that power-gating the resource after at least P consecutive cycles of inactivity would result in a net positive savings of total power consumption of the power-gating-controlled resource, in consideration of the active power used in effecting the powering-on of the gated resource and the leakage power saved in powering-off the same gated resource. In the technical field of power-gating circuitry, the parameter P can be referred to as "breakeven point".

In block 1105, the idle counter associated with each resource is continuously monitored, and decremented if the unit is idle in a given cycle. If the idle counter reaches the zero value, in block 1115, it is an indicator that the corresponding resource may be power-gated off. In that case, in block 1130, the token counter for that resource is reset to zero indicating that the unit should transition to the lowest power state, e.g., a power-gated state. Further, as part of block 1130, the token count of the centralized token management unit (TMU) is incremented to reflect the extra tokens contributed by the resource that has just transitioned to the power-gated state.

While in this lowest power state, in block 1140, the input task queue of the unit is continuously monitored to detect the arrival of new work (i.e., instructions). As soon as such new work is available, in block 1150, the TMU's free token count is queried. If no tokens are available for assignment the query is repeated, until free tokens are available. When such free tokens are available, the token counter for the unit under consideration is set to the maximum affordable value, given the constraints of available free tokens, the token capacity of the targeted unit and the system power level. In block 1180, the targeted resource is moved back to normal operation mode, and in block 1190, the corresponding idle counter is reset to the value P. So long as the resource remains busy with work, control remains in block 1190, transitioning to block 1105 on encountering an idle (inactive) cycle and transitioning back to block 1190 if the unit receives new work before its idle counter counts down to zero.

Figure 12:
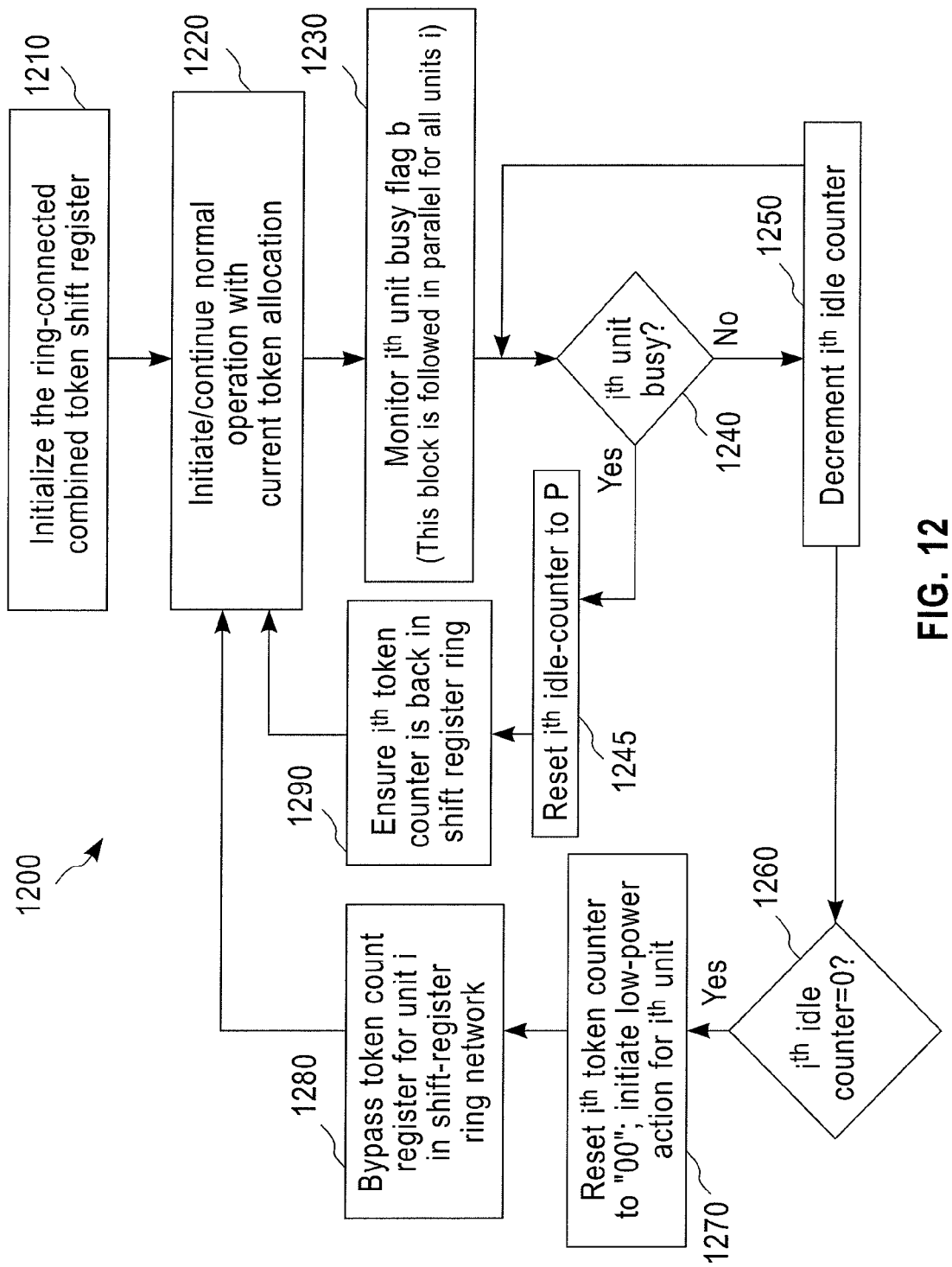
FIG. 12 is a flowchart illustrating a method of distributed token-based control and management of peak power that presupposes a distributed TMS as illustrated by the exemplary embodiment depicted in FIG. 5.

FIG. 12 is a flowchart illustrating a method of distributed token-based control and management of peak power 1200, which presupposes a distributed TMS as illustrated by the exemplary embodiment depicted in FIG. 5. Referring to FIG. 12, in block 1210, the ring-connected combined token shift register (TSR) is initialized to the value "0101 . . . 01" (refer to FIGS. 5, 6 and 8 and associated text in the specification).

Each managed unit's "idle counter" is set to the value of P, as in the method 1100 described above in connection with FIG. 11.

In block 1220, normal operation with current token allocation is started and maintained, as described in the earlier detailed system specification. Subsequently, during such normal operation, in block 1230, each managed unit is continuously monitored in terms of its activity by checking its "busy bit" flag b (block 1240). As soon as the unit transitions to an inactive (or idle) state, its associated idle counter is decremented (block 1250) and this action of decrementing the idle counter is continued in successive cycles of inactivity. If and as soon as the idle counter reaches the zero value (block 1260), the token counter for the targeted unit is reset to "00" and the lowest power transition for that unit is effected (e.g., via power-gating) in block 1270. If the targeted unit becomes busy again prior to its idle counter reaching zero, then, in block 1245, the idle counter is reset to the original value of P. In that case, in block 1220, normal operation is resumed via block 1220, after making sure (block 1290) that its token counter is enabled back to be part of the combined token shift register TSR ring if it was previously bypassed (per block 1280).

On the "unit idle" scenario, following block 1270, in block 1280 control circuitry is configured to ensure that the TSR for the subject unit is bypassed (isolated) out of the combined shift register network. Following this, block 1220 is invoked to resume normal operation, without the subject unit being part of the active resource units.

Figure 13:
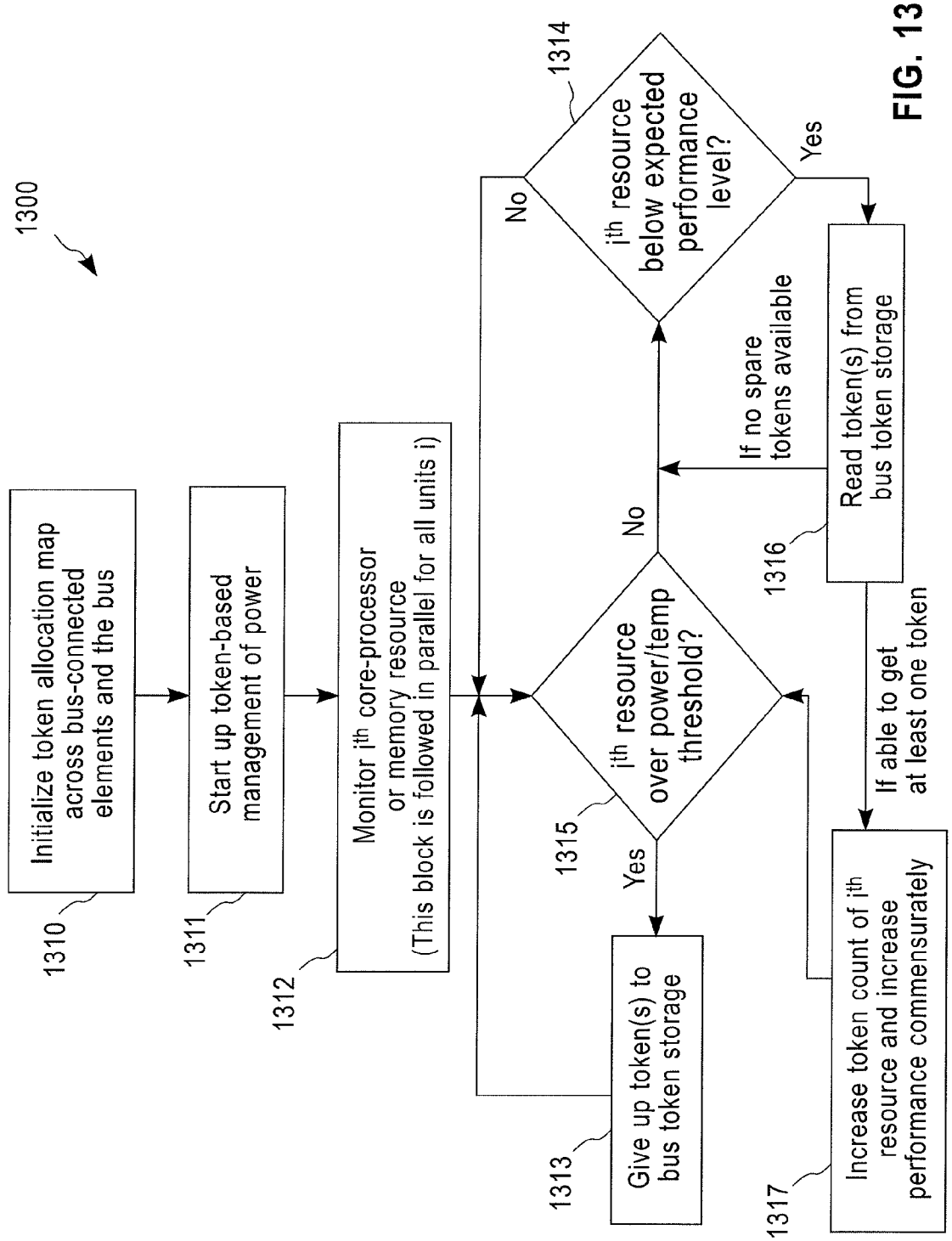
FIG. 13 is a flowchart illustrating a method of token-based control and management of peak power that presupposes a bus-based token exchange system used in the context of multi-core chips or multiprocessor systems, as illustrated by the exemplary embodiment depicted in FIG. 9.

FIG. 13 is a flowchart illustrating a method of token-based control and management of peak power that presupposes a bus-based token exchange system used in the context of multi-core chips or multiprocessor systems, as illustrated by the exemplary embodiment depicted in FIG. 9. Referring to FIG. 13, in block 1310, the initial token allocation map is set and applied across the managed units (including the centralized bus that has token storage space). After the token-managed system is started up via block 1311, each of the bus-connected resources is monitored for power and performance level in block 1312.

If a monitored unit is assessed to be above a predefined power or temperature threshold (in block 1315), it is forced to give up one or more tokens to the centralized bus token storage in block 1313, unit the power/thermal overrun is mitigated. Alternatively, if the resource is below power and temperature limits, its performance level is gauged in block 1314. If it is assessed to be below a predefined minimum performance, block 1316 is used to try and read additional tokens from the centralized bus token storage; such extra tokens are used to boost up performance in the targeted unit in block 1317 (e.g., by increasing its voltage and frequency, if allowed by the system architecture) and then block 1315 is again entered to check if the resource is within the power and temperature limits.

Although exemplary embodiments of the present invention have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing exemplary embodiments may be made without departing from the scope of the invention as defined by the appended claims, with equivalents of the claims to be included therein.

What is claimed is:

1. A method of power management of a system of connected components, comprising:

initializing a token allocation map across the connected components, wherein each component is assigned a power budget as determined by a number of allocated tokens in the token allocation map;

monitoring utilization sensor inputs and command state vector inputs;

determining, at first periodic time intervals, a current average number of instructions completed per machine cycle, a current power consumption level and an assigned power budget for the system based on the utilization sensor inputs and the command state vector inputs; and determining, at second periodic time intervals, a token re-allocation map based on the current average number of instructions completed per machine cycle, the current power consumption level and the assigned power budget for the system, while enforcing a power consumption limit based on a total number of allocated tokens in the system, wherein the token re-allocation map is determined when the current power consumption level is less than the assigned power budget and the current average number of instructions completed per machine cycle is below a threshold.

2. The method of claim 1, wherein initializing the token allocation map across the connected components comprises:

setting a number of tokens available for allocation in accordance with the assigned power budget for the system; and allocating the tokens among the components by setting bits within each component's token counter.

3. The method of claim 2, wherein the assigned power budget for the system is held constant for a period of time such that a token-based peak power control loop stabilizes to enforce the power consumption limit before it can be changed.

4. The method of claim 2, wherein each component's token counter is connected in a ring network as a token shift register.

5. The method of claim 1, wherein monitoring the utilization sensor inputs comprises reading at least one of utilization counters, performance counters, temperature indicators and current measurements.

6. The method of claim 1, wherein monitoring the command state vector inputs comprises reading of encoded commands.

7. The method of claim 1, wherein determining the current power consumption level is based on determining an estimate from at least one of the utilization sensor inputs and values read from temperature indicators.

8. The method of claim 1, wherein determining the assigned power budget for the system comprises decoding of the command state vector inputs.

9. The method of claim 1, wherein determining the token re-allocation map comprises:

determining if the system power consumption level is greater than the assigned power budget for the system; and recomputing the number of tokens available and the allocation of tokens in the token allocation map such that the power consumption limit is enforced upon determining that the current power consumption is not equal to the assigned budget.

10. The method of claim 9, further comprising using a periodic sampling rate to monitor power and performance levels and a periodic actuation rate to re-compute the number of tokens and the allocation of tokens in the token allocation map.

11. The method of claim 1, wherein determining the token re-allocation map comprises one of forwarding of a token to a successor component and receiving a token from a predecessor component using a ring-connected token shift register (TSR) control mechanism.

12. The method of claim 11, wherein determining the token re-allocation map further comprises resetting of each component's token count and disabling or enabling the token counter from the ring-connected TSR control mechanism, depending upon an assessment of one of a level of inactivity and new work demand for that component.

13. A method of localized self-monitoring and control at a component level to adjust a token count of a component comprising:

monitoring an idle counter, which is preset with a fixed value P, associated with the component, while it is decremented on each cycle of successive inactivity of the component;

resetting the component's token counter to zero, donating the unused tokens to central token storage and transitioning the component to a low power state upon determining the idle counter to have reached zero value;

monitoring an input task queue of the component for new instructions while the component is in a powered down state; and acquiring new tokens, resetting the component's token counter, resetting the component's idle counter and transitioning the component back to a powered-up operational mode upon detecting the new instructions.

14. The method of claim 13, wherein determining the token re-allocation map comprises exchanging tokens across components via a shared bus resource, in response to conditions detected at the component level.

15. A system of power management in a system of connected components comprising:

a token management system (TMS) that allocates and deallocates a set of tokens across the connected components, with each token corresponding to a preset quantum of a power budget, and a total number of tokens corresponding to a power budget that can be changed at intervals of time to assure stability of the allocation and deallocation implemented in an inner token control loop; and a plurality of idle counters associated with respective connected components, the connected components contributing respective allocated tokens to the TMS upon detecting a power-gated state, wherein the power-gated state is detected upon an idle counter being decremented over successive cycles of inactivity.

16. The system according to claim 15, wherein each component's token counter is part of a ring-connected token shift register that is used to periodically exchange tokens via nearest neighbor token exchanges.

* * * * *